(12) United States Patent
Haumont et al.

(10) Patent No.: US 7,369,839 B2
(45) Date of Patent: May 6, 2008

(54) METHOD AND APPARATUS FOR DETERMINING INDIVIDUAL OR COMMON MOBILE SUBSCRIBER NUMBER IN MOBILE NETWORK FOR HANDLING MULTIPLE SUBSCRIBERS HAVING THE SAME CALLING LINE IDENTITY

(75) Inventors: Serge Haumont, Helsinki (FI); Jozsef Molnar, Budapest (HU); Laszlo Tatrai, Vác (HU)

(73) Assignee: Nokia Siemens Networks Oy, Espoo (FI)

( * ) Notice: Subject to any disclaimer, the term of this patent is extended or adjusted under 35 U.S.C. 154(b) by 602 days.

(21) Appl. No.: 10/389,287

(22) Filed: Mar. 14, 2003

(65) Prior Publication Data

US 2004/0180676 A1 Sep. 16, 2004

(51) Int. Cl.
*H04M 3/42* (2006.01)
*H04Q 7/20* (2006.01)
(52) U.S. Cl. .................... 455/403; 455/415; 455/433; 455/435.1
(58) Field of Classification Search ..... 455/414.1–417, 455/432.1–435.2, 445, 461–463
See application file for complete search history.

(56) References Cited

U.S. PATENT DOCUMENTS

| | | | | |
|---|---|---|---|---|
| 5,699,407 A | * | 12/1997 | Nguyen | 455/462 |
| 5,806,000 A | * | 9/1998 | Vo et al. | 455/466 |
| 5,819,176 A | * | 10/1998 | Rast | 455/422.1 |
| 5,943,620 A | * | 8/1999 | Boltz et al. | 455/445 |
| 6,094,573 A | * | 7/2000 | Heinonen et al. | 455/412.1 |
| 6,097,963 A | * | 8/2000 | Boltz et al. | 455/518 |
| 6,167,264 A | * | 12/2000 | Palviainen et al. | 455/433 |
| 6,289,223 B1 | * | 9/2001 | Mukherjee et al. | 455/466 |
| 6,393,275 B1 | * | 5/2002 | Alfred | 455/422.1 |
| 6,501,946 B1 | * | 12/2002 | Farah et al. | 455/414.1 |
| 6,775,546 B1 | * | 8/2004 | Fuller | 455/445 |
| 6,807,412 B2 | * | 10/2004 | Ohmoto | 455/418 |
| 2002/0077129 A1 | * | 6/2002 | Kikuta et al. | 455/461 |
| 2002/0164983 A1 | * | 11/2002 | Raviv et al. | 455/432 |
| 2003/0125072 A1 | * | 7/2003 | Dent | 455/551 |
| 2003/0186676 A1 | * | 10/2003 | Ogman et al. | 455/403 |
| 2005/0192035 A1 | * | 9/2005 | Jiang | 455/461 |

* cited by examiner

*Primary Examiner*—Simon Nguyen

(57) ABSTRACT

The present invention provides a mobile network for handling multiple subscribers having the same calling line identity. Each multiple subscriber has an individual mobile subscriber number and a common mobile subscriber number that can be used to replace the individual mobile subscriber number. One mobile subscriber has an identical individual and common mobile subscriber number, and the mobile network receives a mobile subscriber number from a multiple subscriber. The mobile network has a terminal management server that determines whether the mobile subscriber number is either the individual mobile subscriber number or the common mobile subscriber number. Each individual mobile subscriber number and common mobile subscriber number is a Mobile Subscriber Integrated Services Digital Network (MSISDN) number. The mobile subscriber number is used during a location update procedure.

34 Claims, 4 Drawing Sheets

Implementation of the Basic Invention

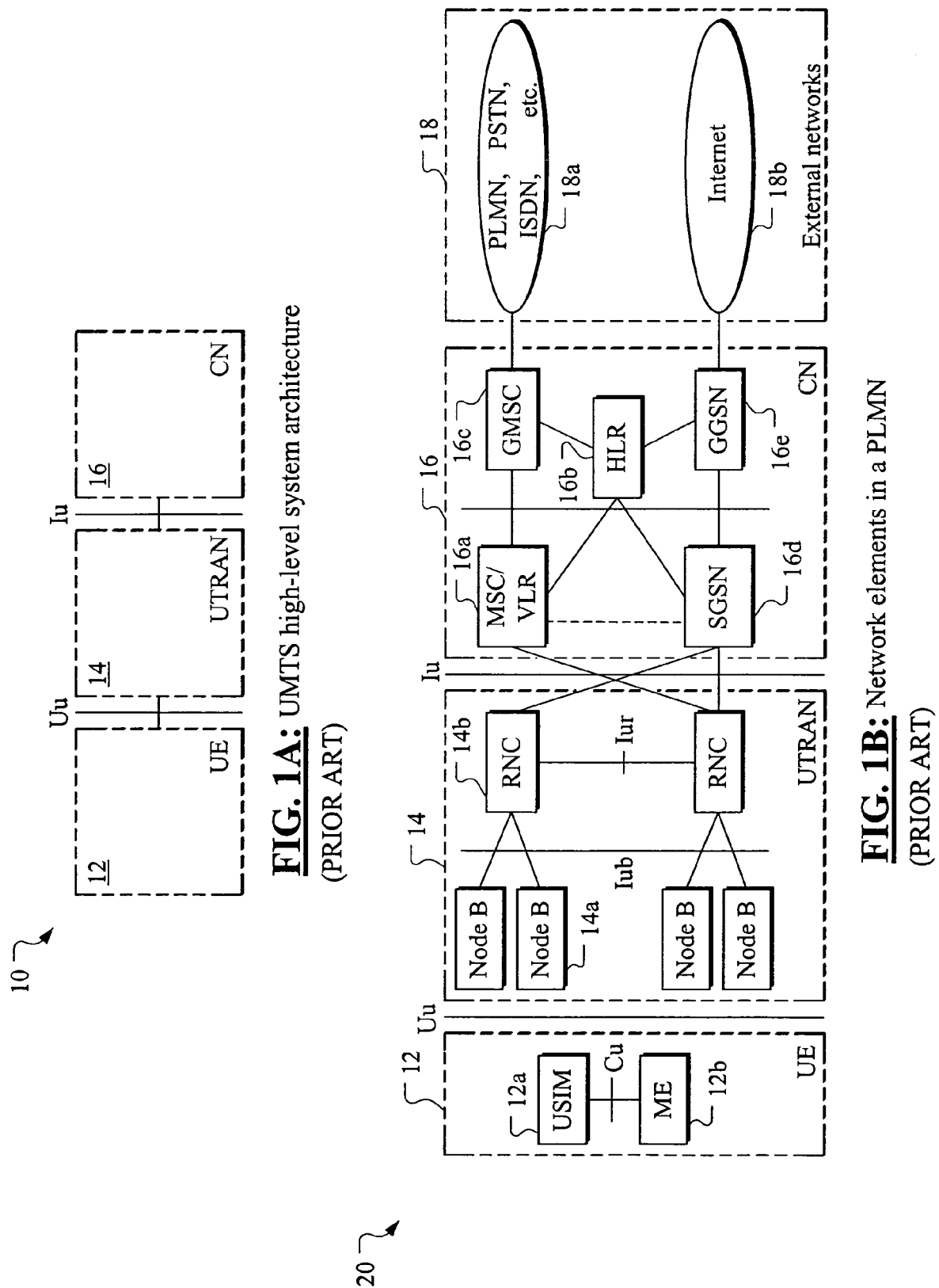
FIG. 1A: UMTS high-level system architecture (PRIOR ART)
FIG. 1B: Network elements in a PLMN (PRIOR ART)

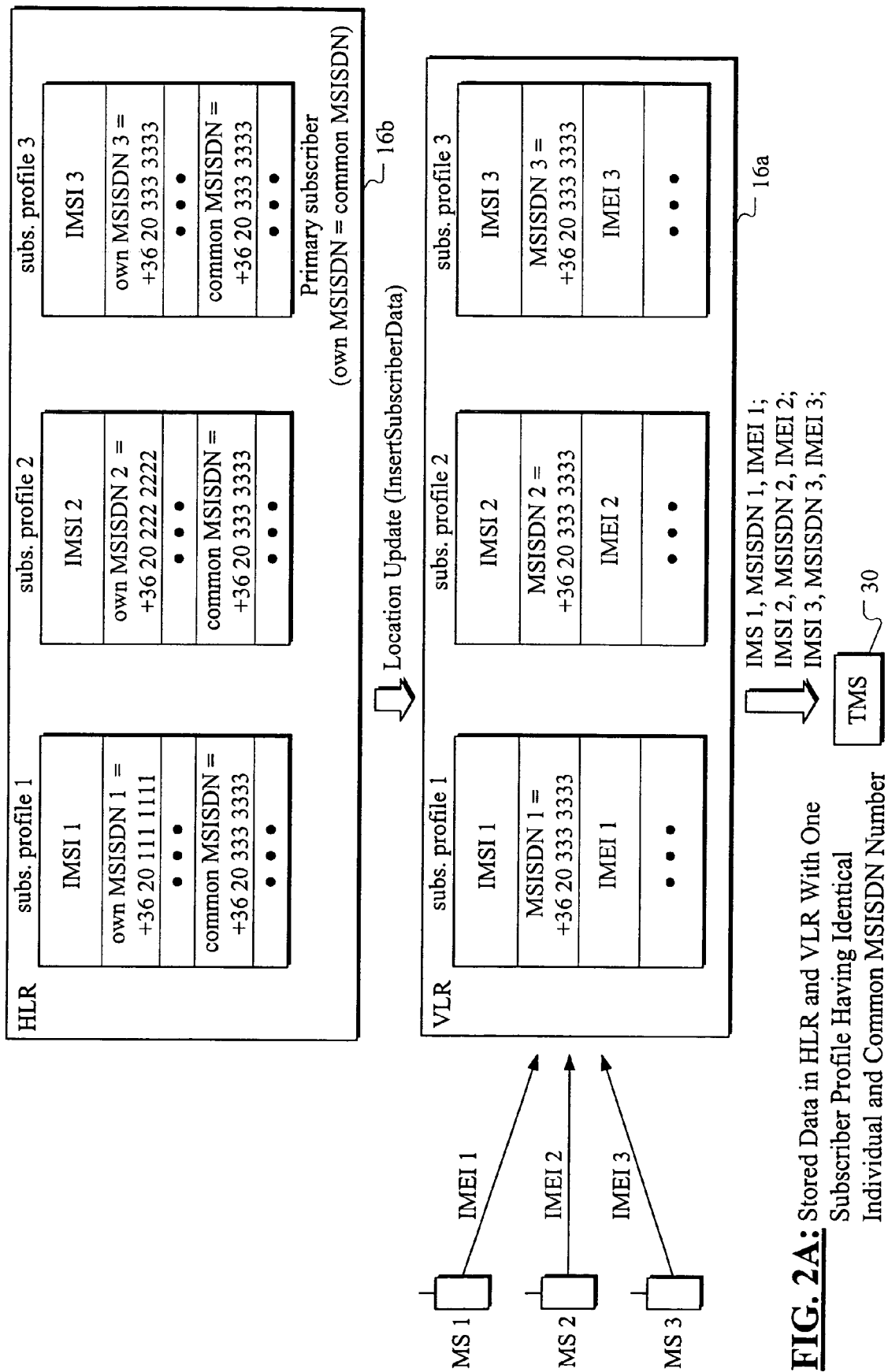
FIG. 2A: Stored Data in HLR and VLR With One Subscriber Profile Having Identical Individual and Common MSISDN Number

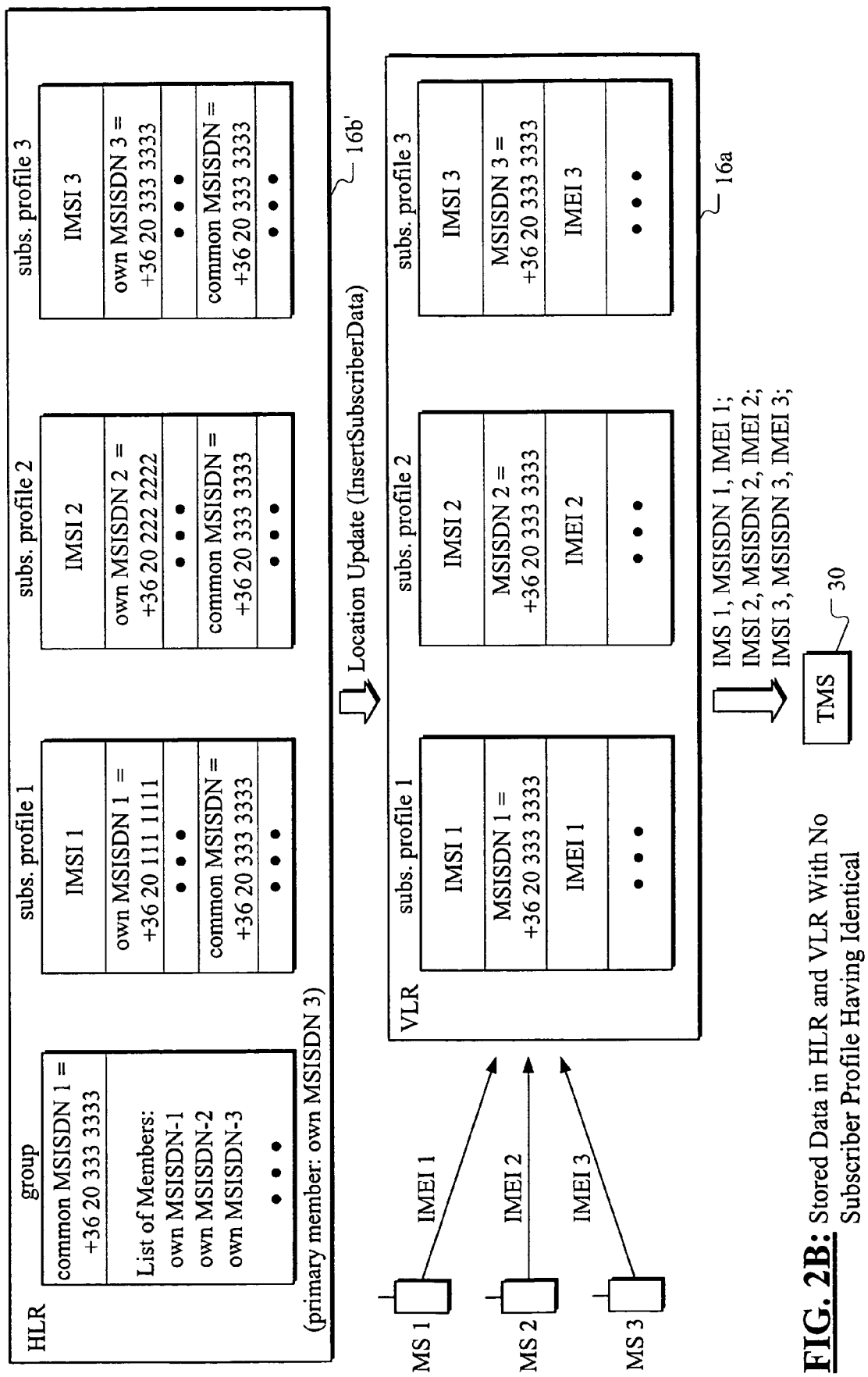
FIG. 2B: Stored Data in HLR and VLR With No Subscriber Profile Having Identical Individual and Common MSISDN Number

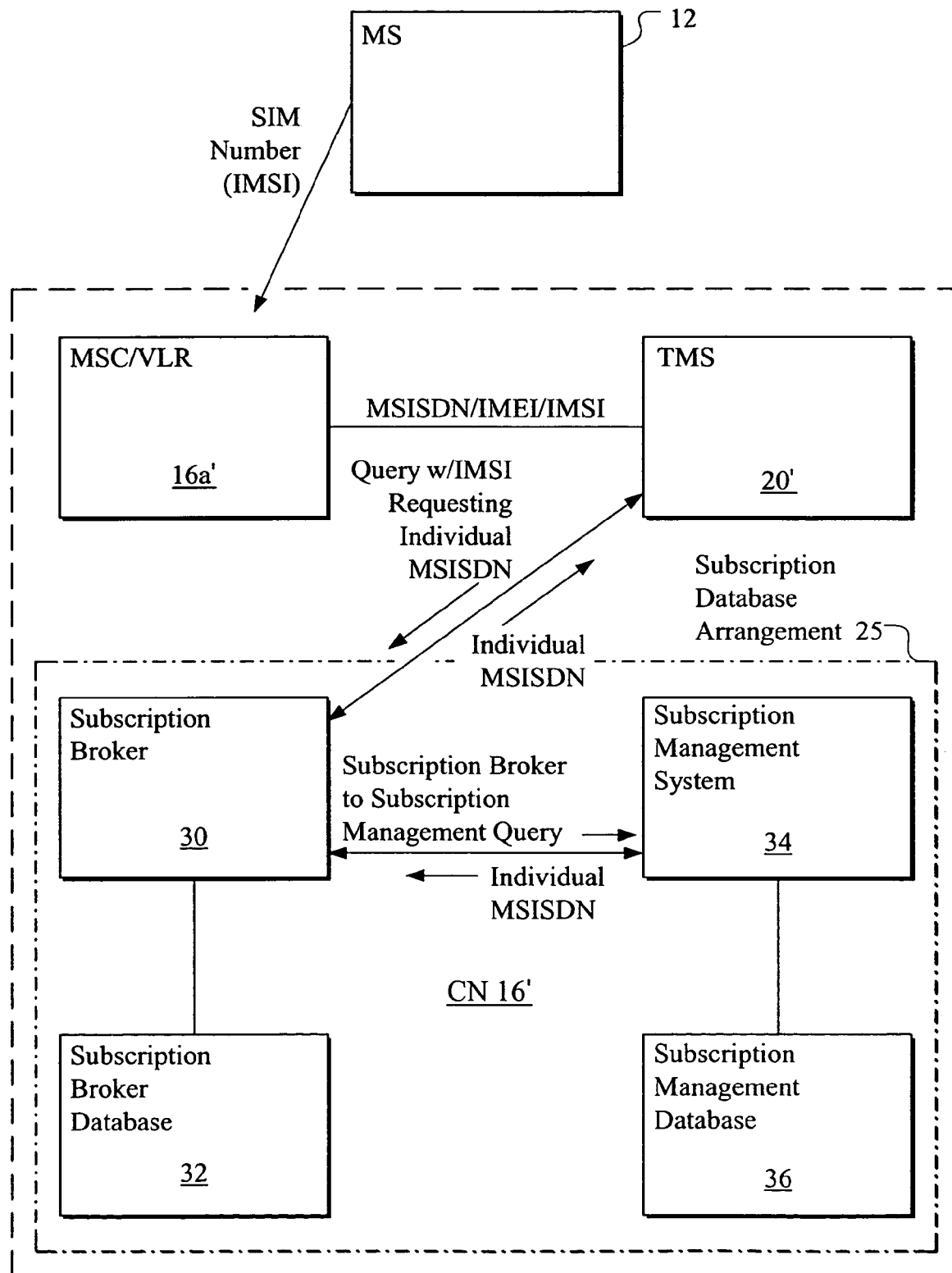
FIG. 3: Implementation of the Basic Invention

METHOD AND APPARATUS FOR DETERMINING INDIVIDUAL OR COMMON MOBILE SUBSCRIBER NUMBER IN MOBILE NETWORK FOR HANDLING MULTIPLE SUBSCRIBERS HAVING THE SAME CALLING LINE IDENTITY

BACKGROUND OF THE INVENTION

1. Field of Invention

The present invention relates to a mobile network; and more particularly relates to a mobile network for handling multiple subscribers having the same calling line identity.

2. Description of Related Art

FIGS. 1A and 1B respectively show the basic elements of a high-level system architecture of a known Universal Mobile Telecommunications System (UTMS) generally indicated as 10 and a known Public Land Mobile Network (PLMN) generally indicated as 20 that together provide a backdrop for understanding the subject matter of the present invention.

In FIG. 1A, the UTMS has User Equipment (UE) 12, a UMTS Terrestrial Radio Access Network (UTRAN) 14 and a Core Network 16 coupled by known interfaces Uu and Iu. In FIG. 1B, the PLMN 20 includes the UE 12, the UTRAN 14 and the CN 16 shown in FIG. 1A coupled to external networks generally indicated as 18, including either another PLMN, Public Switched Telephone Network (PSTN), Integrated Digital Services Network (ISDN) etc., all generally indicated as 18a, as well as the Internet generally indicated as 18b. The UE 12 is known in the art and contains a Universal Subscriber Identity Module (USIM) 12a and Mobile Equipment (ME) 12b. The USIM 12a is a known smart card that is arranged in the ME 12b, holds the subscriber identity, performs authentication algorithms and stores authentication and encryption keys and other information that is need by the ME 12b to interact with the PLMN 20. The ME 12b is also known as a mobile station (MS), which may include many different types of mobile electronic devices such as a mobile phone, a personal digital device (PDA), a laptop computer, etc. The UMTS Terrestrial Radio Access Network (UTRAN) 14 is also known in the art and contains one or more nodes B (i.e. base stations) 14a in combination with one or more Radio Network Controllers (RNC) 14b, that combined to provide a known radio interface between the UE 12 and the CN 16. The CN 16 is a combination of high-capacity switches and transmission facilities that form the backbone of the PLMN 20 in FIG. 1B. The CN 16 includes a Mobile Services Switching Center/Visitor Register Location (MSC/VLR) 16a, a Home Register Location (HLR) 16b, a Gateway Mobile Services Switching Center 16c, a Serving GPRS Support Node 16d, and a Gateway GPRS Support Node (GGSN) 16e, which are all known in the art.

Recently, some networks, such as the PLMN shown in FIG. 1B, have introduced new features providing Same Calling Line Identity (CLI) for multiple subscribers (MS1, MS2, MS3 in FIGS. 2A and B) and allowing incoming calls and SMS arriving with this same CLI to be sent to an appropriate MS. This is part of a Multi-SIM subscription concept. The principle is that the user (subscriber) may have multiple mobile stations (MS) (e.g. one handheld and one in the car) and they will all use the same identity when they originate calls or short messages. In addition, incoming calls and SMS reach the right MS. Calls could for example use sequential ringing (if a first MS does not answer, the call is transferred to second MS and so on) or simultaneous ringing. An SMS is typically sent only to the primary phone. This solution is based on the fact that a respective SIM card, like the SIM card 12a (FIG. 1B), is inserted in each MS, and that this SIM card 12a has its own or individual International Mobile Subscriber Identifier (IMSI) and its own or individual Mobile Subscriber ISDN Number (MSISDN). The IMSI is understood to represent the SIM card number, while the MSISDN is understood to represent the phone number of the MS. The MS also has an individual International Mobile Equipment Identity (IMEI) associate with it, which is understood to be a unique manufacturer number assigned by the manufacturer of the MS. As shown in FIGS. 2A and B, the individual IMSI number (IMSI1, IMSI2, IMSI3) and MSISDN number (MSISDN 1, MSISDN 2, MSISDN 3) are registered in the HLR 16b, 16b' under a subscription profile of the PLMN 20. Additionally, each of these subscription profiles (subscriber profile 1, subscriber profile 2, subscriber profile 3) also has a so-called common MSISDN number, which can be used to replace the individual MSISDN. This way the PLMN 20 that is visited by a MS can receive the common MSISDN of the visiting MS instead of the individual MSISDN during a location updated procedure related to the visiting MS. There are two alternatives for storing the subscriber profiles in the HLR:

- One of the subscriber profiles in the HLR 16b also has an identical individual and common MSISDN numbers, such as subscriber profile 3 in FIG. 2A, and this subscriber is referred to as a so-called primary subscriber, while the mobile phone, which contains that SIM card (IMSI), is referred to as a so-called primary phone.
- Another implementation alternative is none of the profiles have identical individual and common MSISDN number as shown in FIG. 2B. The common MSISDN number identifies a list of members, so called group. One member of the group can be selected as a primary member. In this case, the terminated transactions with the common MSISDN number can be routed further from the group to the primary member with the help of a stored individual identifier of the primary member. The primary member of the group is referred to as a so-called primary subscriber, while the mobile phone, which contains that SIM card (IMSI), is referred to as a so-called primary phone.

The way this feature presently handles a Short Message Service (SMS) message is noted. For example, the SMS message sent to the common MSISDN is only provided to the primary phone. In comparison, the non-primary phone will receive the SMS message only if sent to its individual MSISDN. A common MSISDN and/or individual MSISDN may be sent from the HLR 16b to the VLR 16a, or the SGSN 16d, depending if the VLR 16a or SGSN 16d supports the feature. It should be noted that the feature is described regarding MSC/VLR but is also applicable to SGSN because an SGSN sends and receives SMS exactly like the MSC/VLR. As shown, the VLR also stores the IMEI of the MS.

One problem with this new CLI feature is that it conflicts with the remote MS configuration performed by a Terminal Management Server (TMS) 30 shown FIGS. 2A and B in the PLMN 20 when the MS visits a new PLMN.

Currently, in operation when the MS visits the new PLMN, the MS provides its IMSI number to the MSC/VLR 16a of the visited PLMN. In addition, the MS also provides an IMEI to the MSC/VLR. For example, FIGS. 2A and B shows three mobile stations MS1, MS2, MS3 providing their respective IMEI numbers, IMEI1, IMEI2, IMEI3, to the MSC/VLR 16a upon visiting the PLMN 20. In this case, the MSC/VLR 16a informs the TMS 30 of the new IMSI/MSISDN/IMEI combination. When the TMS 30 detects that a new MSISDN is not yet configured, it will derive from the IMEI the mobile type of the MS, and send the proper configuration to the visiting MS through the SMS message.

In operation, if the MSC/VLR 16a uses the Same CLI for the multiple subscribers feature, the TMS 30 may receive the common MSISDN and a non-primary MS IMEI. The TMS 30 will then attempt to configure this IMEI, but the SMS message addressed to the common MSISDN will reach the primary MS (subscriber profile 3). In view of this, the primary MS will then be misconfigured, and the non-primary MS will not be configured at all.

If the MSC Same CLI feature for multiple subscribers is used, the TMS 30 has no mechanism to determine if the received MSISDN is the individual MSISDN of the MS or the common MSISDN of the MS, and so it cannot use it for remote configuration of the visiting MS.

SUMMARY OF INVENTION

In its broadest sense, the present invention provides a new and unique method and arrangement for a TMS in a mobile network to determine the type of the MSISDN (individual or common) of a visiting MS.

According to the invention, the mobile network can handle multiple subscribers having the same calling line identity, wherein each multiple subscriber has an individual mobile subscriber number and a common mobile subscriber number that can be used to replace the individual mobile subscriber number, wherein in some cases, one mobile subscriber has an identical individual and common mobile subscriber number, and wherein the mobile network receives a mobile subscriber number from a multiple subscriber. The TMS determines whether the mobile subscriber number is either the individual mobile subscriber number or the common mobile subscriber number in any one of a number of different ways.

Each individual mobile subscriber number and common mobile subscriber number is a Mobile Subscriber Integrated Services Digital Network (MSISDN) number.

In a first implementation, the TMS may query a subscriber database (e.g. either a profile server, a HLR or a subscriber manager) with the IMSI, and the subscriber database returns the individual MSISDN of the visiting MS.

In a second implementation, the TMS queries a database with the known MSISDN, and in response the database indicates either that it is the individual MSISDN (can be used for remote management and configuration) of the visiting MS or that it is a common MSISDN (cannot be used for remote management and configuration) of the visiting MS. If the MSISDN of the visiting MS is both the individual and common MSISDN, the database should indicate that it is an individual MSISDN so it can be used for the remote configuration.

In a third implementation, the TMS may have a process which searches all records starting with the same MSISDN. If other records have the same MSISDN but a different IMSI, then the TMS will determine that this MSISDN is a common MSISDN, and will not use it for remote management of the visiting MS. It should be noted that this method will not find out if the common MSISDN is also an individual MSISDN. In addition, this method may have problems if one of the phones is turned on significantly later than the other one. This problem may be limited by proper instruction in the point of sale.

In a fourth implementation, the operator may allocate a different range for the common MSISDN than that for the individual MSISDN. Then the TMS could determine if the MSISDN is either the individual or common number using a process for inspecting the MSISDN.

One problem with this approach is that subscribers are likely to want to keep their old MSISDN as a common number when taking a multi-SIM subscription.

In a fifth implementation, the HLR sends both a common MSISDN and individual MSISDN to the MSC/VLR. Then the MSC/VLR forwards both common MSISDN and individual MSISDN, in addition to IMEI and IMSI, to the TMS. The TMS can then determine that if only one MSISDN is received the terminal may be configured normally, but if both the common MSISDN and individual MSISDN are received, the TMS will determine that the individual MSISDN is to be used to configure the terminal. Optionally, the TMS may upload both common MSISDN and individual MSISDN to a profile server.

This invention also features a terminal management server for handling multiple subscribers having the same calling line identity in a mobile network, wherein the terminal management server determines whether the mobile subscriber number is either the individual mobile subscriber number or the common mobile subscriber number.

The invention also features a method for handling multiple subscribers having the same calling line identity in a mobile network, wherein each multiple subscriber has an individual mobile subscriber number and a common mobile subscriber number that can be used to replace the individual mobile subscriber number, and wherein the mobile network receives a mobile subscriber number from a multiple subscriber. The method features the step of determining in a terminal management server in the mobile network whether the mobile subscriber number is either the individual mobile subscriber number or the common mobile subscriber number. In one embodiment, the step of determining may be implemented using a computer program in the terminal management server.

In the mobile network, the common mobile subscriber number may be used to identify a list of individual mobile subscriber numbers or individual subscriber identifier numbers, from which one is selected as primary member. In this case, the terminated transactions with the common MSISDN number can be routed further from the group to the primary member with the help of stored individual identifier.

BRIEF DESCRIPTION OF THE DRAWING

The drawing, not drawn to scale, includes the following Figures:

FIG. 1A is a block diagram of a known UMTS.

FIG. 1B is a block diagram of a known PLMN.

FIG. 2A shows an example of data stored in the HLR and the VLR of the PLMN.

FIG. 2B shows another example of data stored in the HLR and the VLR of the PLMN.

FIG. 3 shows a part of the CN that forms the basis for the present invention.

DETAILED DESCRIPTION OF INVENTION

FIG. 3 shows one implementation of the present invention. In FIG. 3, similar elements to that shown and described in relation to FIGS. 1A, 1B and 2 are referenced with similar reference numbers, except that an single quote mark "'" is used to show that the element in FIG. 3 is adapted or modified to forms part of the present invention.

In FIG. 3, the CN 16' has a MSC/VLR 16a' that is adapted to receive a new IMSI number (i.e. SIM card number) from the MS 12 and send a new MSISDN/IMEI/IMSI combination to a TMS 20'. The TMS 20' is adapted for performing a remote configuration and reaching the MS 12 by using their individual MSISDN as follows:

In particular, the TMS 20' is arranged to detect the new IMSI from MSC/VLR information, and send a query to a subscription database arrangement generally indicated as 25 to get the individual MSISDN of the MS.

Alternatively, the TMS 20' may be arranged to detect a new subscriber (IMSI, IMEI and MSISDN) from the MSC/VLR information, and send a query with the MSISDN to the HLR possibly through a broker. The query to the HLR may be the standard MAP message—SendRoutingInformationForSMS. In return, the HLR will reply with the IMSI of the subscriber. If this IMSI is the same as the IMSI received from the MSC/VLR, the MSISDN can be used to sent an SMS to this MS for terminal management (i.e. to configure the MS). Note that in this case, either the MS is not using same CLI for multiple MS, or it is the primary MS. But if the IMSI returned by HLR is different than the IMSI sent by the MSC/VLR, then the TMS can determine that this IMEI cannot be reached by SMS using this MSISDN. And so it will not attempt to configure this MS through an SMS.

As shown, the query is sent to a subscription broker 30, which can be a profile server. The subscription broker 30 provides the TMS 20' with access to other subscription storage information, and optionally stores part of the information in its local database, called herein the subscription broker database 32. In one case, after receiving a query from the TMS 20', the subscription broker 30 will check if the individual MSISDN of the MS is known from its individual database 32.

If not, the subscription broker 30 will send a request to a subscription management system 34 having another database. For example, the subscription management system 34 has a subscription management database 36 (e.g. subscription manager) that accepts the query with IMSI and returns the individual MSISDN and preferably also other information (e.g. common MSISDN) that the subscription broker 30 could use for other service.

A person skilled in the art would appreciate how to implement the TMS 20', the subscription broker 30 and the subscription management system 34 using hardware, software or a combination thereof to perform the functionality described herein. For example, the TMS may include a microprocessor based architecture having a microprocessor (CPU), a Random Access Memory (RAM), A Read Only Memory, input/output device and control, address and data buses. The scope of the invention is not intended to be limited to any particular type or kind thereof.

The scope of the invention is not intended to be limited to what subscription database or what subscription element stores or provides the individual MSISDN.

It should be noted that a benefit of this system is that the subscriber broker 30 is automatically updated by the subscription management database 36 when a new subscription is taken into use.

This feature solves a problem identified recently, and therefore is a new candidate for the TMS 20'.

Currently, a method to detect new MS for remote management is not standardized, but it is expected that it will become part of the 3GPP or the OMA standards in the future.

SCOPE OF THE INVENTION

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

We claim:

1. A mobile network for handling multiple subscribers having the same calling line identity, wherein each multiple subscriber has an individual mobile subscriber number and a common mobile subscriber number that can be used to replace the individual mobile subscriber number, wherein one mobile subscriber has an identical individual and common mobile subscriber number, and wherein the mobile network receives a mobile subscriber number from a multiple subscriber, characterized in that the mobile network has a terminal management server that determines whether the mobile subscriber number is either the individual mobile subscriber number or the common mobile subscriber number when performing a remote configuration for a mobile subscriber visiting the mobile network.

2. A mobile network according to claim 1, wherein one mobile subscriber has an identical individual and common mobile subscriber number.

3. A mobile network according to claim 2, wherein each individual mobile subscriber number and common mobile subscriber number is a Mobile Subscriber Integrated Services Digital Network (MSISDN) number.

4. A mobile network according to claim 1, wherein the common mobile subscriber number is used to identify a list of individual mobile subscriber numbers or individual subscriber identifier numbers, from which one is selected as a primary member.

5. A mobile network according to claim 1, wherein each individual mobile subscriber number and common mobile subscriber number is a Mobile Subscriber Integrated Services Digital Network (MSISDN) number.

6. A mobile network according to claim 1, wherein the mobile network includes a home location register for storing a home subscriber profile database having either the individual mobile subscriber number, the common mobile subscriber number, or a combination thereof.

7. A mobile network according to claim 6, wherein the home subscriber profile database also contains an individual subscriber identifier number for each mobile subscriber.

8. A mobile network according to claim 7, wherein the individual subscriber identifier number is an individual International Mobile Subscriber Identifier (IMSI) number.

9. A mobile network according to claim 1, wherein the mobile network includes a visiting location register for storing a visiting subscriber profile database having either the individual mobile subscriber number, the common mobile subscriber number, or a combination thereof.

10. A mobile network according to claim 9, wherein the home subscriber profile database also contains an individual subscriber identifier number for each mobile subscriber.

11. A mobile network according to claim 10, wherein the individual subscriber identifier number is an individual International Mobile Subscriber Identifier (IMSI) number.

12. A mobile network according to claim 9, wherein each mobile subscriber provides an equipment identifier number that is stored in the visiting subscriber profile database.

13. A mobile network according to claim 12, wherein equipment identifier number is an International Mobile Equipment Identity (IMEI) number.

14. A mobile network according to claim 1,
wherein the mobile network has a subscriber database containing individual mobile subscriber numbers;
wherein the terminal management server queries the subscriber database with an individual subscriber identifier number and;
wherein the subscriber database returns a selected individual mobile subscriber number based on the individual subscriber identifier number.

15. A mobile network according to claim 14,
wherein the individual subscriber identifier number is an individual International Mobile Subscriber Identifier (IMSI) number; and
wherein the individual mobile subscriber number is a Mobile Subscriber Integrated Services Digital Network (MSISDN) number.

16. A mobile network according to claim 14,
wherein the subscriber data is contained in either a profile server, a home register location or a subscription manager.

17. A mobile network according to claim 1,
wherein the terminal management server queries a database with a known mobile subscriber number; and
wherein the database provides an indication that the known mobile subscriber number is an individual or common mobile subscriber number if the individual and common mobile subscriber number are different for the mobile subscriber, or indicates that the known mobile subscriber number is an individual mobile subscriber number if the individual and common mobile subscriber number are identical for the mobile subscriber.

18. A mobile network according to claim 17, wherein the known mobile subscriber number is a Mobile Subscriber Integrated Services Digital Network (MSISDN) number.

19. A mobile network according to claim 1,
wherein the terminal management server searches all records starting with the same mobile subscriber number; and
if other records have the same mobile subscriber number but a different individual subscriber identifier, then the terminal management server determines that this mobile subscriber number is the common mobile subscriber number that will not be used for remote management of a visiting mobile subscriber.

20. A mobile network according to claim 19,
wherein the different individual subscriber identifier number is an individual International Mobile Subscriber Identifier (IMSI) number.

21. A mobile network according to claim 1,
wherein in the mobile network a different range is allocated for the common mobile subscriber number than that allocated for the individual mobile subscriber number; and
wherein the terminal management server determines if the mobile subscriber number is either the individual or common mobile subscriber number based on inspecting the range of the mobile subscriber number.

22. A mobile network according to claim 1, wherein the terminal management server uses this information for remote configuration of a visiting mobile subscriber in the mobile network.

23. A mobile network according to claim 22, wherein the terminal management server sends a proper configuration to the visiting mobile subscriber via short messaging service (SMS).

24. A method for handling multiple subscribers having the same calling line identity in a mobile network, wherein each multiple subscriber has an individual mobile subscriber number and a common mobile subscriber number that can be used to replace the individual mobile subscriber number, wherein one mobile subscriber has an identical individual and common mobile subscriber number, and wherein the mobile network receives a mobile subscriber number from a multiple subscriber for use during a location update procedure, characterized in that the method comprises the step of
determining with the terminal management server whether the mobile subscriber number is either the individual mobile subscriber number or the common mobile subscriber number when performing a remote configuration for a mobile subscriber visiting the mobile network.

25. A method according to claim 24, wherein the method includes using this information for remote configuration of a visiting mobile subscriber in the mobile network.

26. A method according to claim 25, wherein the method includes sending a proper configuration from the terminal management server to the visiting mobile subscriber via short messaging service (SMS).

27. A method for handling multiple subscribers having the same calling line identity in a mobile network, each multiple subscriber having an individual mobile subscriber number and a common mobile subscriber number that can be used to replace the individual mobile subscriber number, and the mobile network receiving a mobile subscriber number from a multiple subscriber, characterized in that the method comprises the step of:
determining in a terminal management server in the mobile network whether the mobile subscriber number is either the individual mobile subscriber number or the common mobile subscriber number when performing a remote configuration for a mobile subscriber visiting the mobile network.

28. A method according to claim 27, wherein the step of determining is implemented using a computer program in the terminal management server.

29. A method according to claim 27, wherein the method includes using this information for remote configuration of a visiting mobile subscriber in the mobile network.

30. A method according to claim 29, wherein the method includes sending a proper configuration from the terminal management server to the visiting mobile subscriber via short messaging service (SMS).

31. A terminal management server for handling multiple subscribers having the same calling line identity in a mobile network, wherein each multiple subscriber has an individual mobile subscriber number and a common mobile subscriber number that can be used to replace the individual mobile subscriber number, wherein one mobile subscriber has an identical individual and common mobile subscriber number, and wherein the mobile network receives a mobile subscriber number from a multiple subscriber, characterized in that
the terminal management server determines whether the mobile subscriber number is either the individual mobile subscriber number or the common mobile subscriber number when performing a remote configuration for a mobile subscriber visiting the mobile network.

32. A terminal management server according to claim 31, wherein the terminal management server uses a computer program to determine whether the mobile subscriber number is either an individual or common mobile subscriber number.

33. A terminal management server according to claim 31, wherein the terminal management server uses this information for remote configuration of a visiting mobile subscriber in the mobile network.

34. A terminal management server according to claim 33, wherein the terminal management server sends a proper configuration to the visiting mobile subscriber via short messaging service (SMS).

* * * * *